2,962,349

PROCESS FOR RECOVERING A METAL TUNGSTATE FROM AN ALKALINE TRONA PROCESS BRINE

J Hill Anglin, Jr., Amistad, N. Mex.
(1720 NE. 47, Oklahoma City 11, Okla.)

No Drawing. Filed Aug. 26, 1957, Ser. No. 680,430

6 Claims. (Cl. 23—51)

This invention relates to a method of treating tungstate solutions and more particularly to a method of recovering tungstate from dilute solutions thereof in strongly alkaline medium. This application is a continuation-in-part of Serial No. 644,480, filed March 7, 1957, now abandoned.

It is known that tungstates are recoverable from alkaline solutions thereof by neutralization to overcome most of the objectionable hydroxide or carbonate which may be present and would interfere with preparation of a tungstate precipitate. Where the tungstate concentration is high, the procedure of neutralization is economically feasible. But heretofore, no practicable process has been known to precipitate tungsten in any form by any base without precipitating a large amount of material not desired. Particularly impractical has been the alternative neutralization of alkaline brine such as carbonates containing large proportions of carbonate and small proportions of tungstate. The acid necessary for such neutralization would not be justified by the small proportion of tungstate recovered.

The present invention, which has practical and economic value, involves the treatment of an aqueous alkaline solution containing tungstate with a water-soluble compound capable of yielding cations selected from the group consisting of zinc, cadmium, ferrous, ferric, nickel, chromic, cobaltous and manganous cations whereby the corresponding tungstate is precipitated. Neither byhydroxide nor carbonate interfere with this precipitation. Just enough precipitating cation need be added to precipitate substantially all of the tungstate. No significant proportion of the reagent is therefore lost by reaction with the carbonate or hydroxide present.

Useful precipitants for this purpose are zinc oxide, zinc chloride, zinc sulfate, zinc nitrate, cadmium chloride, cadmium sulfate, cadmium nitrate, ferrous chloride, chromic chloride, cobaltous chloride, nickel chloride, manganous chloride, manganous nitrate, the chlorides being preferred.

Ordinarily, approximately a stoichiometric proportion of metallic precipitant such as zinc, cadmium, iron or other water-soluble compound is necessary in proportion to the tungstate. This includes a slight excess of three or even ten percent over the stoichiometric proportion to insure maximum tungstate precipitation. Of course, if other reactive groups are present in the brine, such as for example, phosphate, arsenate or sulfides, sufficient metal compound is desirably added to precipitate these and have approximately a stoichiometric proportion left for reaction with the tungstate.

It is essential that the precipitation and preferably separation occur at a pH between about 4.5 and 5.5, more particularly at a pH of about 5. At a pH as high as 6, significant proportions of tungstate remain in solution and are not removable as insoluble tungstate. Mere acidification is therefore insufficient. A critical pH of between about 4.5 and 5.5 must be used. With trona brine the addition of the precipitating reagent, for example, zinc chloride or ferrous chloride as indicated above effects the correct pH adjustment concomitant with providing a slight excess of precipitating reagent over the stoichiometric proportion necessary for reaction with the tungstate. When necessary, the pH is suitably adjusted with additional acid such as hydrochloric or sulfuric acid.

The precipitated tungstate is separable from the supernatant liquid as by filtration, decantation or centrifugation to give a metallic tungstate, illustratively zinc tungstate, which upon treatment with acid, sulfuric acid or hydrochloric acid, leaves tungstic oxide and provides a recovery of metal precipitant which is then reusable in the treatment of fresh alkaline solution containing tungstate.

The reaction of the zinc, cadmium, iron, chromium, cobalt, nickel or manganese compound with alkaline tungstate is effective at room or elevated temperatures. This is a matter of convenience suitably adjusted to the particular plant operation. Satisfactory results are observable at room temperature without being dependent upon working with hot solutions.

The following examples are illustrative of the process of this invention and are not to be taken as limiting.

*Example 1*

A waste brine from a trona processing plant at Trona, California, has the following approximate percentage composition by weight:

| | | | |
|---|---|---|---|
| $Na_2B_4O_7$ | 6.36 | $Na_3AsO_4$ | 0.80 |
| KCl | 11.53 | NaBr | 0.68 |
| NaCl | 7.64 | NaI | 0.11 |
| $Na_2CO_3$ | 7.88 | NaF | 0.04 |
| $Na_2SO_4$ | 2.43 | $Na_3WO_4$ | 0.25 |
| $Na_2S$ | 1.76 | $H_2O$ | 59.00 |
| $Na_3PO_4$ | 1.36 | | |

This brine has a pH of about 8.7. This alkaline brine was mixed with a ten percent solution of zinc chloride with the zinc chloride being about three percent in excess of the exact stoichiometric proportion calculated as necessary for reaction with the tungstate, phosphate, arsenate and sulfide. The precipitate of zinc tungstate, phosphate, arsenate and sulfide is separated by filtration mixed with 10 N hydrochloric acid to redissolve the zinc as zinc chloride and leave a residue of tungstic oxide, arsenic oxide and sulfur. This residue is separated by filtration and heated in the presence of air to volatilize the sulfur as sulfur dioxide. Continued heating volatilizes the arsenic oxide and leaves a residue of tungstic oxide. The arsenic oxide is removed from the air by cooling with additional air followed by electrostatic precipitation. The sulfur dioxide is scrubbed out of the air with water or alkali.

The acidified zinc chloride separated from the tungstic oxide, arsenic oxide and sulfur is used in the treatment of additional alkaline brine containing tungstate.

*Example 2*

Otherwise like Example 1, using cadmium sulfate in place of zinc chloride gave the same results. On recovery of the cadmium, cadmium chloride was produced which then was used in treatment of fresh brine to give satisfactory tungstate precipitate.

*Example 3*

Otherwise like Example 1, using manganous chloride in place of zinc chloride gave the same results.

*Example 4*

The tungstic oxide and arsenic oxide mixture obtained in Example 1 by volatilization or burning off the sulfur was heated to about 290° C. and swept with hydrogen chloride to remove arsenic chloride and leave a residue of tungstic oxide.

*Example 5*

A caustic soda solution of sodium tungstate containing 10% caustic soda and a small proportion of sodium tungstate, about 1%, was treated with zinc chloride in an amount slightly over the stoichiometric proportion necessary for the tungstate content. A satisfactory precipitation of zinc tungstate was achieved.

*Example 6*

Otherwise like Example 1, using ferrous chloride in place of zinc chloride gave the same results. The iron tungstate precipitate, when dried, without further purification, was useful in the preparation of ferrous tungsten alloys.

*Example 7*

To a solution containing 10% caustic soda and 1% sodium tungstate there was added sufficient sulfuric acid to bring the pH to about 5. Addition of a stoichiometric proportion of ferrous chloride effected a quantitative precipitation of ferrous tungstate.

I claim:

1. A process for the recovery of a tungstate from an alkaline Trona process brine containing tungsten values at a concentration of less than 1% by weight based on tungstic oxide and having a relatively high concentration of a carbonate with respect to said tungsten values, comprising the steps of adjusting the pH of said alkaline brine to from about 4.5 to about 5.5, dissolving in said alkaline brine from an amount stoichiometrically sufficient to precipitate the tungsten values to amount 10% by weight in excess of said stoichiometric amount of a water-soluble salt of a metal selected from the group consisting of zinc, cadmium, iron, nickel, cobalt, chromium and manganese, whereby a tungstate of said metal is precipitated, and separating the precipitated tungstate.

2. The process of claim 1 wherein the water-soluble salt is selected from the group consisting of chlorides and sulfates.

3. The process of claim 1 wherein the water-soluble salt is zinc chloride.

4. The process of claim 1 wherein the water-soluble salt is regenerated by reacting the separated tungstate with an acid selected from the group consisting of sulfuric acid and hydrochloric acid.

5. The process of claim 1 wherein the amount of the water-soluble salt dissolved in the brine is about 3% by weight in excess of the amount stoichiometrically sufficient to precipitate the tungsten values.

6. The process of claim 1 wherein the pH of the alkaline brine is adjusted to about 5.

References Cited in the file of this patent

UNITED STATES PATENTS

| 2,351,678 | Hall | June 20, 1944 |
| 2,388,306 | Burwell | Nov. 6, 1945 |
| 2,556,255 | Carosella | June 12, 1951 |

OTHER REFERENCES

Mellor: "Comprehensive Treatise on Inorganic and Theoretical Chemistry," Longmans, Green and Co., N.Y., vol. II, pages 788, 796, 797, 801 and 802.